United States Patent
Vaughan et al.

(10) Patent No.: US 10,515,759 B2
(45) Date of Patent: Dec. 24, 2019

(54) MLCC WITH ID MARKER FOR ORIENTATION

(71) Applicant: KEMET Electronics Corporation, Simpsonville, SC (US)

(72) Inventors: Randal J. Vaughan, Simpsonville, SC (US); Gregory L. Crosby, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 15/810,775

(22) Filed: Nov. 13, 2017

(65) Prior Publication Data

US 2018/0137977 A1 May 17, 2018

Related U.S. Application Data

(60) Provisional application No. 62/421,719, filed on Nov. 14, 2016.

(51) Int. Cl.
| | |
|---|---|
| *H01G 4/12* | (2006.01) |
| *H01G 4/30* | (2006.01) |
| *H01G 2/24* | (2006.01) |
| *H01G 4/008* | (2006.01) |
| *H01G 4/232* | (2006.01) |
| *H01G 2/06* | (2006.01) |
| *H01G 4/012* | (2006.01) |
| *H01G 4/20* | (2006.01) |
| *H01G 4/33* | (2006.01) |

(52) U.S. Cl.
CPC .............. *H01G 4/12* (2013.01); *H01G 2/065* (2013.01); *H01G 2/24* (2013.01); *H01G 4/0085* (2013.01); *H01G 4/012* (2013.01); *H01G 4/20* (2013.01); *H01G 4/2325* (2013.01); *H01G 4/30* (2013.01); *H01G 4/306* (2013.01); *H01G 4/33* (2013.01)

(58) Field of Classification Search
CPC ............ H01G 4/12; H01G 2/065; H01G 2/24; H01G 4/0085; H01G 4/012; H01G 4/20; H01G 4/2325; H01G 4/30; H01G 4/306; H01G 4/33
USPC ...................................... 361/301.4
See application file for complete search history.

(56) References Cited

U.S. PATENT DOCUMENTS

| | | | |
|---|---|---|---|
| 5,680,685 A | 10/1997 | Bischoff | |
| 2004/0000744 A1* | 1/2004 | Grigg | B29C 64/135 264/401 |
| 2007/0193675 A1 | 8/2007 | Gurav et al. | |
| 2011/0149466 A1 | 6/2011 | Hwang et al. | |
| 2012/0319537 A1* | 12/2012 | Sakuratani | H01L 41/0471 310/366 |

(Continued)

*Primary Examiner* — Michael P McFadden
(74) *Attorney, Agent, or Firm* — Joseph T. Guy; Patent Filling Specialist, Inc.

(57) ABSTRACT

An MLCC with an identification mark consisting of non-active internal electrodes which can be used to determine chip orientation for mounting or reeling. This allows an MLCC with substantially similar width and thickness to be oriented with the electrodes in a preferred direction (either vertical or horizontal with respect to the board) that results in the minimum noise and vibration compared to other orientations. The presence of an identification mark can also allow for a means of preferentially orienting an MLCC which has an active area that is offset from the geometric center of the part.

16 Claims, 7 Drawing Sheets

(56) References Cited

U.S. PATENT DOCUMENTS

2014/0240895 A1* 8/2014 Lee .................... H01G 4/12
  361/301.4
2017/0169954 A1* 6/2017 Ota .................... H01G 4/012

* cited by examiner

MLCC WITH ID MARKER FOR ORIENTATION

CROSS-REFERENCE TO RELATED APPLICATIONS

The present application claims priority to U.S. Provisional Application No. 62/421,719 filed Nov. 14, 2016, which is incorporated herein by reference.

BACKGROUND

The present invention is related to an improved electronic component, and particularly a multi-layered ceramic capacitor (MLCC), which allows for improved manufacturing efficiency. More specifically, the present invention relates to an improved MLCC comprising an identification (ID) mark which is integral to the MLCC, and permanent, thereby eliminating the impact of abrasive processes.

MLCC'S are well known and widely used in the electronics industry. MLCC's can be quite small yet they are typically symmetrical in geometry thereby allowing for use in pick and place machinery as is well known in the art. Unfortunately, the requirement that MLCC's be compatible with pick and place machines has limited the technology suitable for use in an MLCC as any advance must maintain the geometrical symmetry.

Most electronic parts requiring proper orientation are marked during manufacture and the marking is identified by the pick and place machinery thereby allowing proper orientation. Unfortunately, MLCC's are made in very large volumes starting with the lamination of many interleaved layers of active electrode layers and ceramic followed by, dicing, abrasive treatment, and termination whereby the internal orientation of the various layers is no longer discernible. By way of example, MLCC's are typically made by laminating large sheets which are then fired at high temperature to sinter the ceramic. The large sheets are then cut, or diced, to form the individual MLCC's, which may be no more than a mm in any dimension, and the individual MLCC's are then tumbled in abrasive medium to remove any rough edges prior to further processing. Any attempt to provide an orientation mark on the surface would not survive the furnace and, if it did, would not survive the abrasive treatment. Even if one could determine the orientation, and provide an orientation mark after dicing, the mark would not survive the abrasive treatment and the many millions of parts formed simultaneously eliminates the realistic possibility of marking individual capacitors after manufacturing.

Those of skill in the art have therefore been limited in MLCC design to those geometries and arrangements which can be mounted in any orientation. This has mitigated the possibility of asymmetrical MLCC's in large scale use.

The present invention provides a method of forming an MLCC with an ID mark for orientation wherein the mark is permanent, observable after firing, tumbling and finishing and which does not consume space of the capacitive couple of the capacitor.

SUMMARY OF THE INVENTION

It is an object of the invention to provide an electronic component, particularly an MLCC, with an ID mark for orientation.

It is a particular feature of the invention to provide an electronic component, and particularly an MLCC, with an ID mark which is permanent, does not require separate processing, and can be easily detected by optical systems of conventional pick and place equipment.

These and other embodiments, as will be realized, are provided in an MLCC capacitor. The MLCC capacitor comprises a multiplicity of conductive internal electrodes of alternating polarity with dielectric ceramic layers there between and a multiplicity of non-active ID markers wherein each non-active ID marker is coplanar with at least one internal electrode and the non-active ID markers extend to an outer boundary of the MLCC.

Yet another embodiment is provided in a method for forming an MLCC comprising:
forming a ceramic precursor layer;
printing an active layer on the ceramic precursor layer wherein the active layer comprises a multiplicity of conductive internal electrodes and a multiplicity of non-active ID markers wherein each non-active ID marker of the non-active ID markers is coplanar with at least one internal electrode of the internal electrodes;
forming an alternating stack of the ceramic precursor layers and active layers wherein adjacent active layers are offset;
sintering the stack;
dicing the stack to form discrete capacitors wherein the non-active ID markers extend to a boundary of the discrete capacitors; and
forming external terminations in electrical contact with the internal electrodes wherein adjacent internal electrodes are terminated to opposite polarity.

Yet another embodiment is provided in a method for forming an electronic component. The method comprises:
providing an electronic component comprising conductive internal electrodes with dielectric there between and at least one ID marker coplanar with at least one conductive internal electrode wherein the ID marker extends to an outer boundary of the electronic component; and
placing the electronic component onto a circuit board with said ID marker oriented in a pre-determined orientation relative to the circuit board.

DESCRIPTION

The present invention is directed to an electronic component, and particularly an MLCC, with an identification (ID) mark comprising non-active internal electrodes which can be used to determine chip orientation for mounting or reeling. This allows an MLCC with substantially similar width and thickness to be oriented with the electrodes in a preferred direction, either vertical or horizontal with respect to the board, thereby allowing for the incorporation of technology which is not geometrically symmetrical with the body of the capacitor. The presence of an identification mark can also allow for a means of preferentially orienting an MLCC which has an active area that is offset from the geometric center of the part.

The problem of controlling the orientation of an MLCC which has substantially the same width and thickness is solved by incorporating an identification mark consisting of non-active internal electrodes which extend to the external face, or outer boundary, and can be used to orient the chip during reeling or mounting of the finished part. The ID mark can be used to preferentially align the internal electrodes parallel to or perpendicular to the board or reel. The presence of this type of identification mark can be used to orient the MLCC with the internal electrodes vertically or horizontally, or to distinguish the top of the MLCC from the bottom or distinguish one side from the other, thereby allowing for any design feature requiring preferential orientation.

Multi-layer ceramic capacitors (MLCC) are formed by interleaving thin layers of ceramic insulator electrodes of opposed polarity and co-sintering to produce a monolithic component. The layering process requires the ceramic and electrode to be suspended in organic media. In general, the ceramic and metal layers are alternately cast, by one of a myriad of techniques, to form a monolith which is first heated to remove volatiles and then sintered as a monolith.

The invention will be described with reference to the figures forming an integral, non-limiting, component of the disclosure. Throughout the various figures similar elements will be numbered accordingly.

Figure 1:
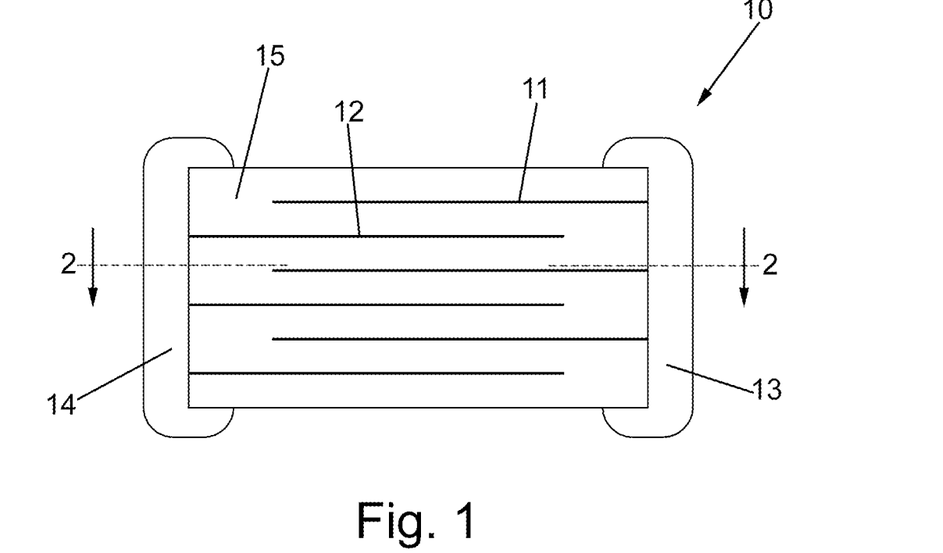
FIG. 1 is a cross-sectional schematic view of an embodiment of the invention.

A cross-sectional schematic view of a multi-layer ceramic capacitor is illustrated in FIG. 1. In FIG. 1, the capacitor, generally represented at 10, comprises a multiplicity of conductive internal electrodes, 11 and 12, of alternating polarity with dielectric ceramic layers, 15, dispersed there between. The alternating conductive internal electrodes terminate at opposing external terminals, 13 and 14. The ID mark is not visible in FIG. 1.

Figure 2:
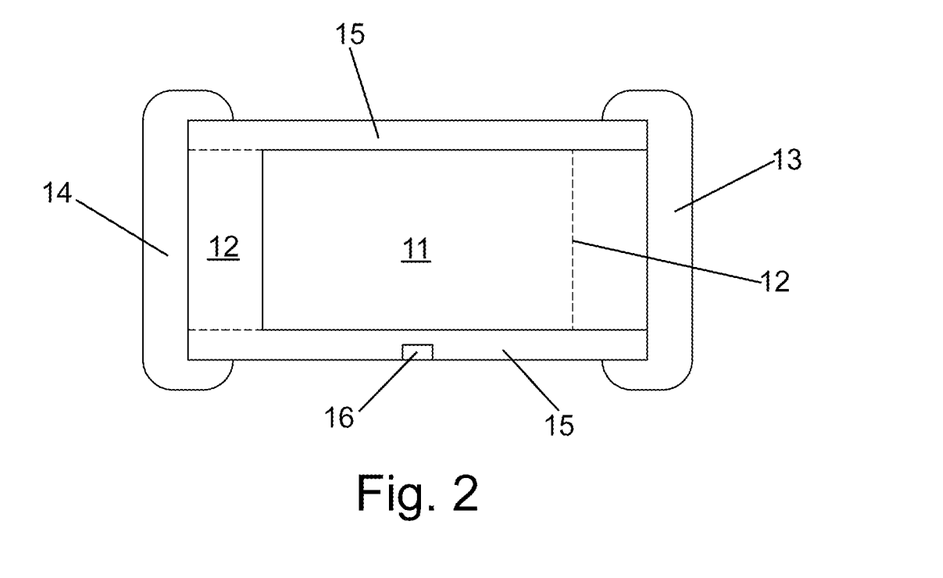
FIG. 2 is a cross-sectional schematic view of an embodiment of the invention.

A cross-sectional schematic view of the capacitor of FIG. 1 taken along line 2-2 is provided in FIG. 2. The ID mark, 16, is coplanar with an internal electrode and extends to the outer extent of the capacitor body.

MLCC's are prepared by sequentially layering ceramic precursors and conductor precursors in appropriate registration as known in the art. After a sufficient number of layers are built up the assembly is heated to form alternating layers of internal conductors and sintered ceramic.

Figure 3:
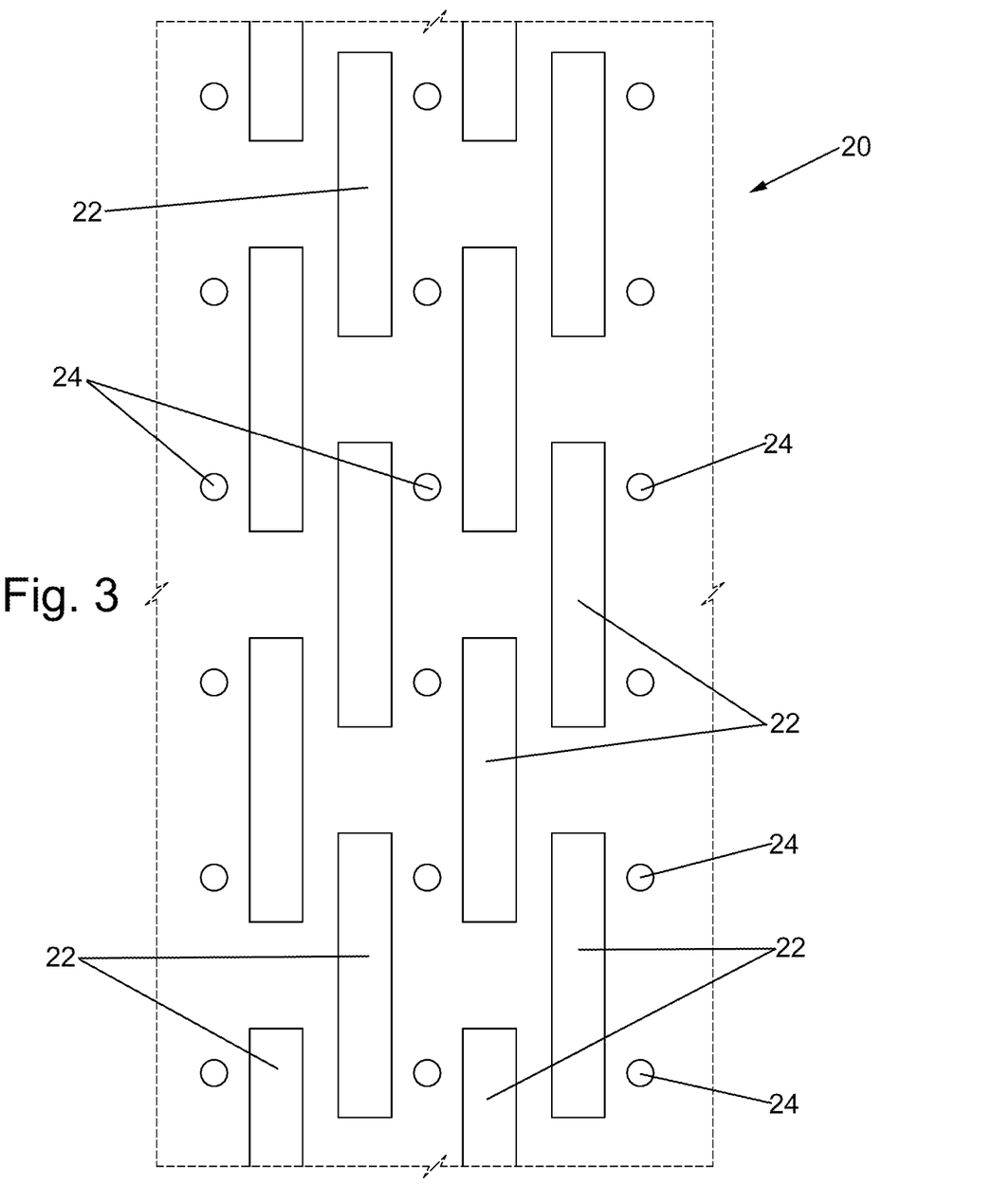
FIG. 3 is a schematic representation of an active layer of an embodiment of the invention.
Figure 4:
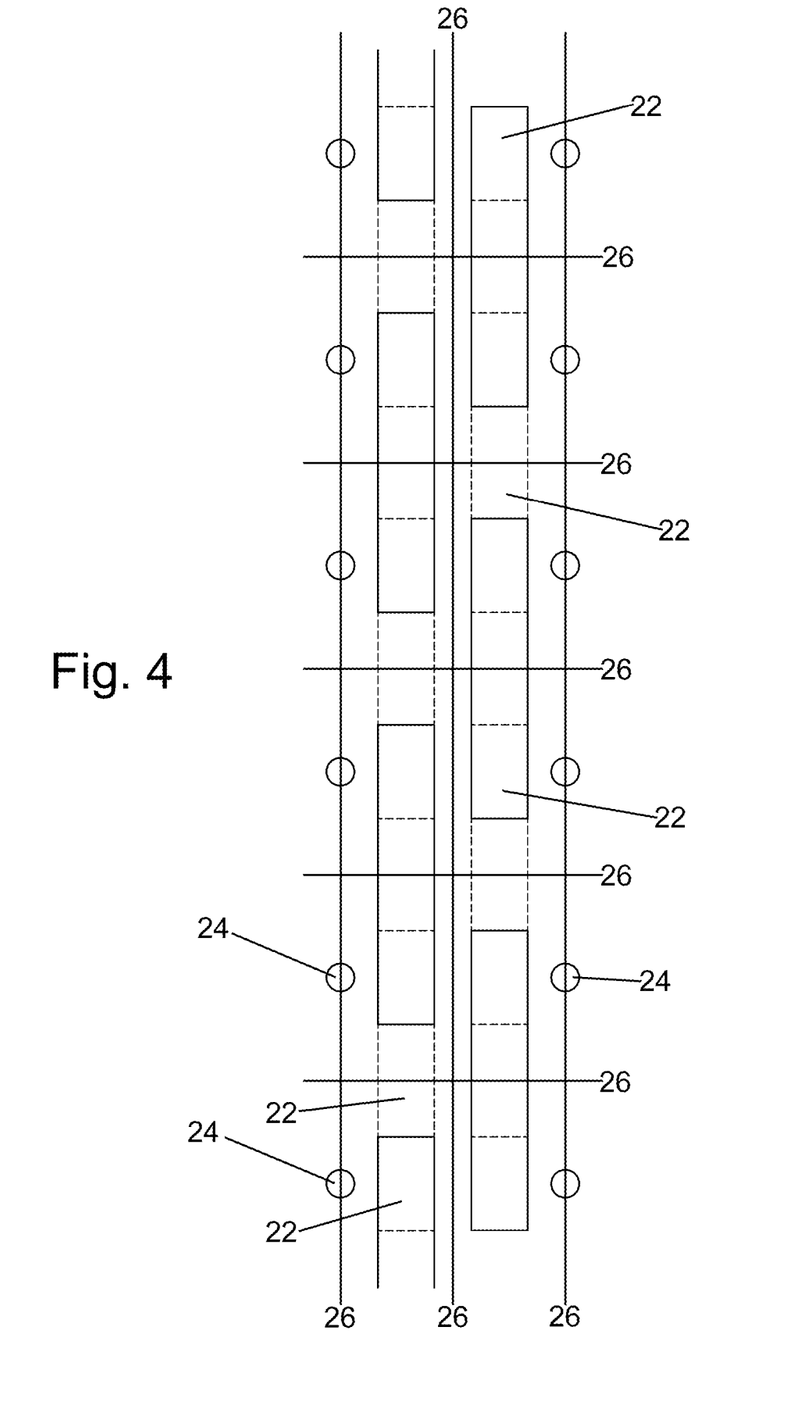
FIG. 4. is a schematic representation of overlayed active layers of an embodiment of the invention.
Figure 5:
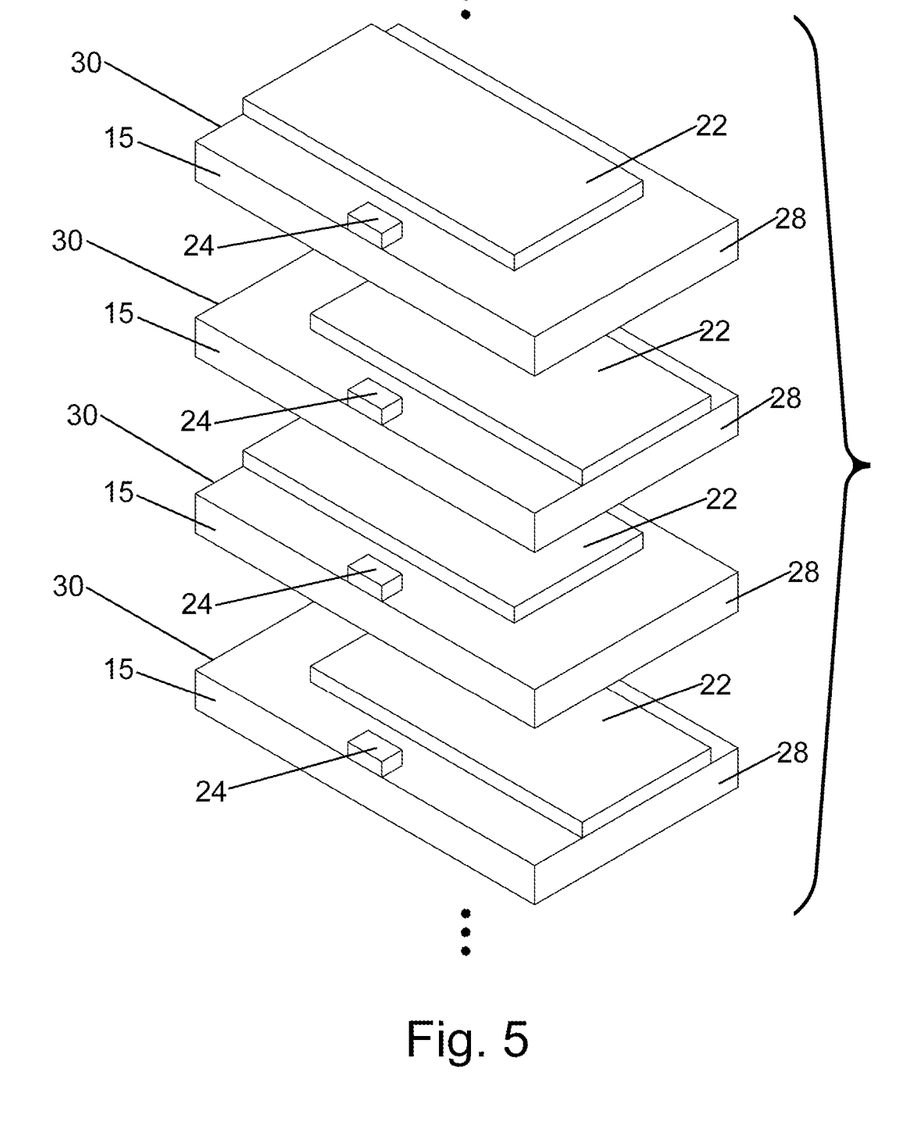
FIG. 5 is an exploded schematic perspective view of an embodiment of the invention.

An embodiment of the invention is will be described with reference to FIGS. 3-5. In FIG. 3, an active layer, 20, is illustrated wherein the active layer comprises internal electrodes, 22, and non-active electrode ID marks, 24, the purpose of which will be understood from further discussion herein. As would be realized adjacent active layers are arranged in parallel offset fashion with dielectric there between, as illustrated in FIG. 4, wherein adjacent layers are offset such that when the stack is diced at dice lines, 26, the dice line will sever an internal electrode on one level resulting in the internal electrode extending to the dice line, and the same dice line will sever the ceramic between internal electrodes in the adjacent parallel layers and therefore the internal electrode will not extend to the dice line in the adjacent parallel layers. A schematic exploded view of a series of layers is illustrated in FIG. 5 wherein layers alternately terminate at a first edge, 28, or a second edge, 30, such that after dicing and terminating adjacent active electrodes terminate at external terminations of opposite polarity as well known in the art. Although illustrated with internal electrodes being in parallel planes alternate active layers can be used to form floating electrodes, which do not terminate, and co-planer active layers of opposite polarity as would be realized to those of skill in the art.

Adjacent ID markers may collective align or may, collectively, form a pattern which will be appear on the outer boundary of the eventual capacitor as will be more fully understood. The ID marks are not electrically terminated, and preferably not electrically connected to any circuitry, and are therefore non-active. The internal electrodes and ID markers are preferably formed of the same material. The collection of ID marks may collectively form any shape or size on a surface perpendicular to the internal electrodes. The ID marks may be on any combination of active layers up to, and including, on all active layers.

Figure 6A:
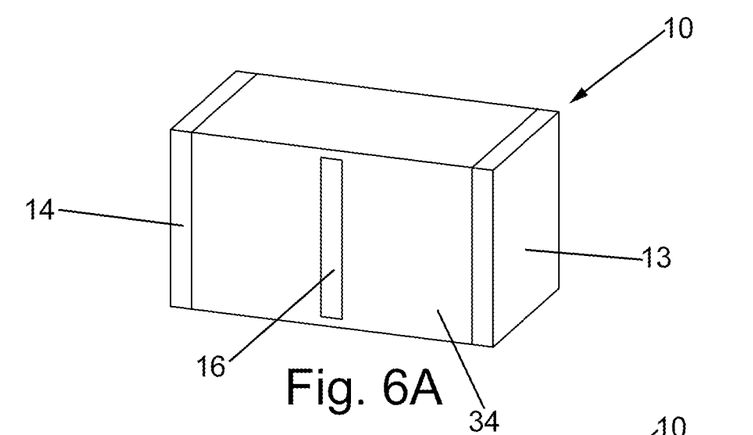
FIGS. 6A-6C and 7-8 are schematic representations of embodiments of the invention.
Figure 6B:
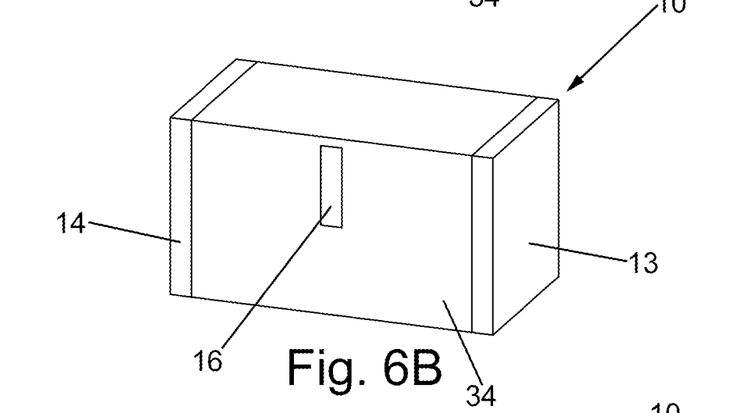
Figure 6C:
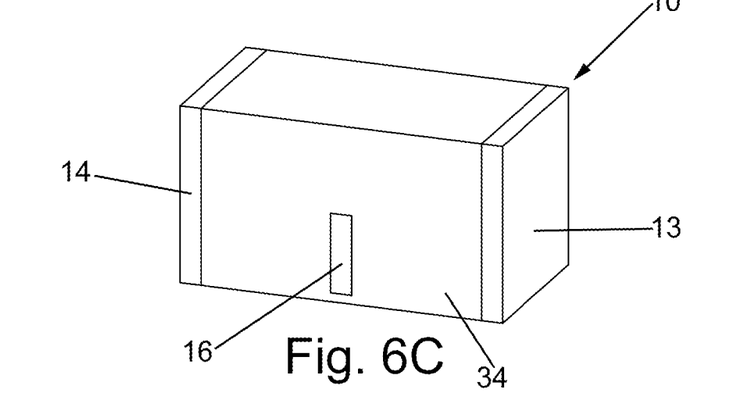
Figure 7:
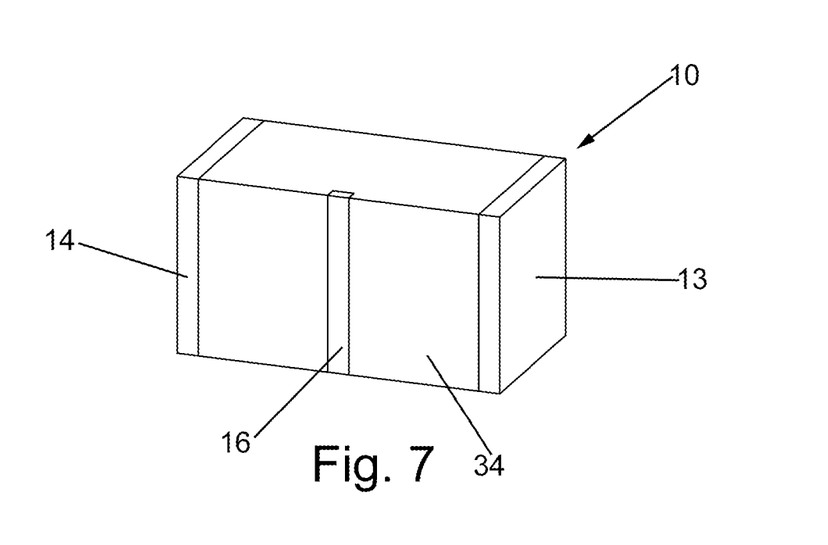
Figure 8:
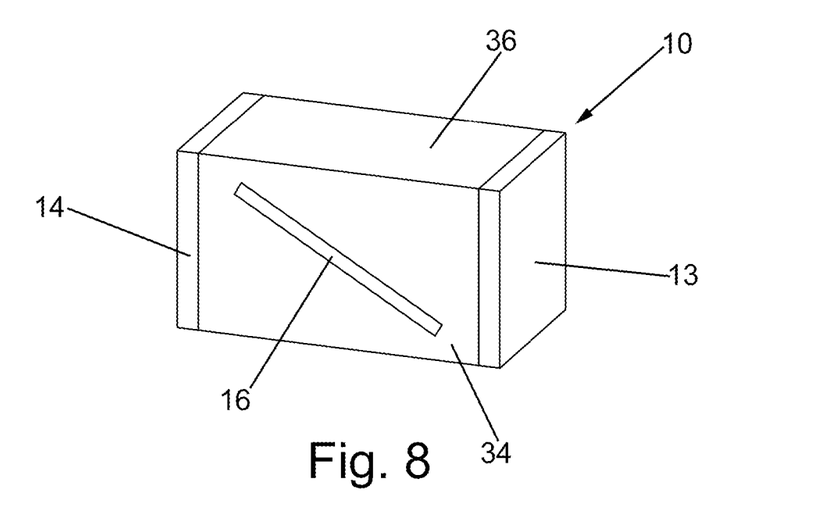

FIGS. 6A-6C and 7-8 are schematic representations illustrating different markings indicating a specific side thereby allowing for orientation of the MLCC. In FIG. 6A the ID marks are co-linear and do not extend the full height of the outer boundary, 34, but are symmetrical with respect to the body of the MLCC. In FIGS. 6B and 6C the ID mark is offset vertically towards either the top or bottom thereby allowing for asymmetry in the arrangement of layers throughout the capacitor allowing for the active internal electrodes to be placed further away from, or closer to, the substrate. In FIG. 7 the ID marks are co-linear and extend the full height of the outer boundary, 34. In FIG. 8 the ID marks are not perpendicular to the adjacent outer boundary 36. Based on the discussion herein, it would be apparent that the ID mark is pixelated with each individual mark being essentially the height of the internal layer. Each ID mark can be correlated with other ID marks to make an image or pattern the complexity of which is a design choice.

Figure 9:
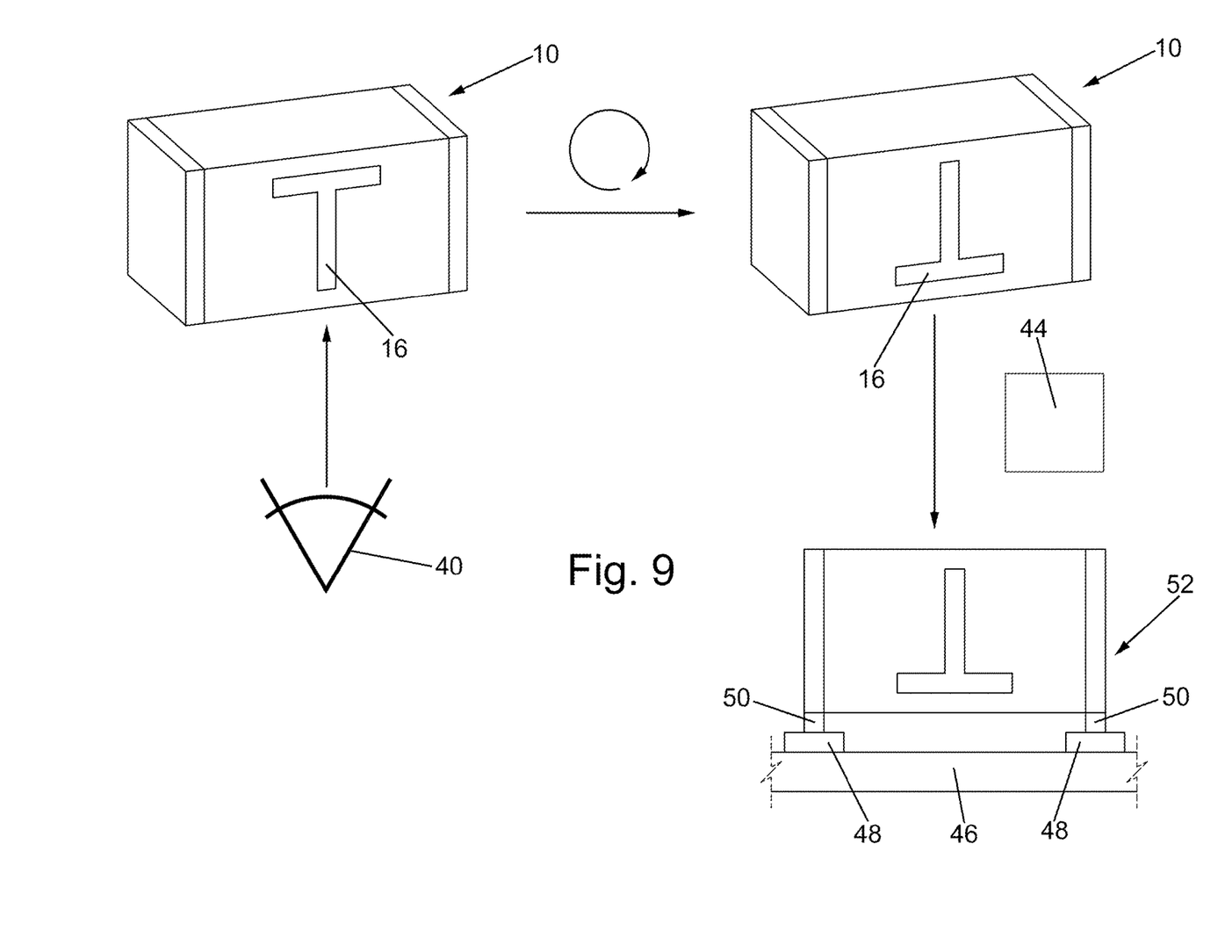
FIG. 9 is a schematic representation of an embodiment of the invention.

An embodiment of the invention will be described with reference to FIG. 9 wherein the process of forming an electronic component, 52, is illustrated schematically. In FIG. 9 an electronic component represented as a capacitor, 10, comprising an ID mark, 16, illustrated in the shape of a "T" is observed by a detection system, 40. For the purposes of illustration, the detection system indicates the ID mark is improperly oriented for assembly and therefore a manipulator, 42, reorients the capacitor. A pick and place device, 44, places the capacitor in proper position on a circuit board, 46, wherein the capacitor is electrically attached to the circuit, preferably at pads, 48, by an interconnect, 50, such as a solder conductive adhesive, polymer solder, TLPS bond, sintered metal interconnects, diffusion solders or direct copper bonds.

While illustrated and described with reference to an MLCC, the present invention is suitable for use with any electronic component comprising conductive internal electrodes with ceramic there between. Capacitors, resistors, varistors, inductors, fuses, overvoltage discharge device and combinations thereof are suitable for demonstration of the invention.

The ceramic material used as a dielectric is not particularly limited herein. Materials suitable for use in C0G and X7R capacitors are particularly suitable for use in the demonstration of the present invention due to their wide spread use in the manufacture of MLCC's and the ability to manufacture overvoltage protection components in facilities designed for the manufacture of MLCC's.

Each dielectric layer has a preferred thickness of up to about 50 µm, more preferably up to about 20 µm. The lower limit of thickness is about 0.5 µm, preferably about 2 µm.

The number of dielectric layers, and active layers, stacked is generally from 2 to about 2000, preferably from 2 to about 450.

The conductor which forms the internal electrode layers is not limited herein, although a base metal is preferably used since the dielectric material of the commonly employed dielectric layers typically has anti-reducing properties. Typical base metals are nickel and nickel alloys. Preferred nickel alloys are alloys of nickel with at least one member selected from Mn, Cr, Co, and Al, with such nickel alloys containing at least 95 wt % of nickel being more preferred. It is to be noted that nickel and nickel alloys may contain up to about 0.1 wt % of phosphorous and other trace components. Other conductors which may be employed as internal electrodes include copper, precious metals or alloys thereof with particularly preferred precious metals selected from palladium and silver. It would be understood that with copper or precious metal containing internal electrodes lower temperature firing is preferred.

The thickness of the internal electrode layers, and ID marks, may be suitably determined in accordance with a particular purpose and application although the upper limit is typically about 25 µm, more preferably about 2.5 µm, and the lower limit is typically about 0.5 µm. Most preferable is a thickness of about 1 µm.

The conductor which forms the external electrodes is not particularly limited, although inexpensive metals such as nickel, copper, and alloys thereof are preferred. The thickness of the external electrodes may be suitably determined in accordance with a particular purpose and application although it generally ranges from about 10 µm to about 50 µm. In one embodiment a conductive metal, preferably silver, filled epoxy termination is utilized as a termination.

The multilayer ceramic chip capacitor of the present invention is generally fabricated by forming a green chip by conventional printing and sheeting methods using pastes. After firing of the chip the external terminations, also referred to as external electrodes, are formed by printing, or transferring, precursors of the external termination onto the surface, in contact with the internal electrodes terminating at the surface, followed by baking.

Paste for forming the dielectric layers can be obtained by mixing a raw dielectric material with an organic vehicle. The raw dielectric material may be a mixture of oxides and composite oxides. Also useful are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 µm, preferably about 0.5 µm.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The binder used herein is not critical and may be suitably selected from conventional binders such as ethyl cellulose. Also, the organic solvent used herein is not critical and may be suitably selected from conventional organic solvents such as terpineol, butylcarbinol, acetone, and toluene in accordance with a particular application method such as a printing or sheeting method.

Paste for forming external electrodes is prepared by the same method as the internal electrodes layer-forming paste.

No particular limit is imposed on the organic vehicle content of the respective pastes. Often the paste contains about 1 to 5 wt % of the binder and about 10 to 50 wt % of the organic solvent. If desired, pastes may contain any other additives such as dispersants, plasticizers, dielectric compounds, and insulating compounds. The total content of these additives is preferably up to about 10 wt %.

A green chip may be prepared from the dielectric layer-forming paste and the internal electrode layer-forming paste. In the case of a printing method, a green chip is prepared by alternately printing the pastes onto a substrate of polyethylene terephthalate (PET), for example, to form a laminar stack, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets. A capacitor with a large number of layers can be prepared in this manner as well known in the art.

The method of forming the capacitor is not particularly limiting herein.

The binder is removed from the green chip and fired. Binder removal may be carried out under conventional conditions, preferably under the conditions where the internal electrode layers are formed of a base metal conductor such as nickel and nickel alloys.

For binder removal the heating rate is preferably about 5 to 300° C./hour, more preferably 10 to 100° C./hour. The holding temperature is preferably about 200 to 400° C., more preferably 250 to 300° C. and the holding time is preferably about ½ to 24 hours, more preferably 5 to 20 hours in air. An inert or reducing atmosphere may be provided at temperatures exceeding 225° C. to limit oxidation of the internal electrodes. The green chip is fired in an atmosphere which may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C. Lower holding temperatures below the range would provide insufficient densification whereas higher holding temperatures above the range can lead to poor DC bias performance. The heating rate is preferably 50 to 500° C./hour, more preferably 200 to 300° C./hour with a holding time of ½ to 8 hours, more preferably 1 to 3 hours. The cooling rate is preferably 50 to 500° C./hour, more preferably 200 to 300° C./hour. The firing atmosphere preferably is a reducing atmosphere. An exemplary atmospheric gas is a humidified mixture of $N_2$ and $H_2$ gases.

Firing of the capacitor chip in a reducing atmosphere is preferably followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at low oxygen partial pressures below the range whereas the internal electrode layers are likely to be oxidized at oxygen partial pressures above this range.

For annealing, the chip is preferably held at a temperature of lower than 1,100° C., more preferably 500° C. to 1,000° C. Lower holding temperatures below this range would oxidize the dielectric layers to a lesser extent, thereby leading to a shorter life. Higher holding temperatures above the range can cause the internal electrode layers to be oxidized, which leads to a reduced capacitance, and to react with the dielectric material, which leads to a shorter life. Annealing can be accomplished simply by heating and cooling. In this case, the holding temperature is equal to the highest temperature on heating and the holding time is zero.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternatively, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out in an inert nitrogen atmosphere gases at about 600 to 800° C., and about 10 minutes to about 1 hour.

After the monolith is sintered connections to the internal electrodes must be formed by applying termination materials, typically thick film pastes, followed by additional sintering to contact the internal electrodes of the MLCC. This sintering step may be detrimental to the ceramic and/or internal conductors.

The external terminations are preferably formed by dipping with other methods, such as ink-jet spraying being suitable. Once deposited these external terminations are sintered or cured to adhere them to the ceramic and connect to the internal electrodes.

Pads are preferably formed on the external electrodes by plating or other methods known in the art.

The multilayer ceramic chip capacitors of the invention can be mounted on printed circuit boards, for example, by soldering.

The external terminations of the electronic components are not particularly limited herein with the proviso that they can be attached to a pad, either active or mechanical, by an interconnect such as solder, conductive adhesive, polymer solder, TLPS bond, sintered metal interconnects, diffusion solders or direct copper bonds. The external termination may be one component of TLPS, as will be more fully described herein, wherein additional components of the TLPS are either inserted between the external termination to be bound or is integral to the surface to which the external termination is to be bound. The TLPS materials are compatible with surface finishes containing silver, tin, gold, copper, platinum, palladium, nickel, or combinations thereof, either as lead frame finishes, component connections or internal electrodes to form an electronically conductive metallurgical bond between two surfaces.

Transient liquid phase sintering (TLPS) adhesives form a termination to an electronic element or attach external terminations to a surface such as a solder pad thereby functioning as an interconnect. TLPS terminations have the advantage of being able to accommodate different surface finishes as well as electronic elements of differing lengths. Furthermore, since no solder balls are formed electronic elements can be stacked on top of each other with only TLPS there between and without the gaps normally required for cleaning as with solder attachment technology. TLPS can be directly bonded with the internal electrodes of the electronic component, when the electronic element is an MLCC, and the termination can be formed at low temperature. In an embodiment higher density terminations can be prepared by using a thermo-compression process thereby forming improved external lead attachment bonds.

Solders are alloys which do not undergo a change in composition after the first reflow. Solders have only one melting point and can be remelted an indefinite number of times. The most common solder is 60% Sn40% Pb. Solders have been the materials of choice in electronics to provide the mechanical and electrical interconnects between electronic elements and circuit boards or substrates. Solders are very well suited for mass volume production assembly processes. The physical properties of solder can be altered simply by changing the ratios or the metals used to create a solder alloy. When solder is referenced herein it will imply an alloy of at least two metals that can be remelted multiple times at nearly the same temperature.

Transient liquid phase sintering (TLPS) bonds are distinguishable from solders. TLPS materials are mixtures of two or more metals or metal alloys prior to exposure to elevated temperatures thereby distinguishing the thermal history of the material. TLPS materials exhibit a low melting point prior to exposure to elevated temperatures, and a higher melting point following exposure to these temperatures. The initial melting point is the result of the low temperature metal or an alloy of two low temperature metals. The second melting temperature is that of the intermetallic formed when the low temperature metal or alloy forms a new alloy with a high temperature melting point metal thereby creating an intermetallic having a higher melting point. TLPS materials form a metallurgical bond between the metal surfaces to be joined. Unlike tin/lead or lead (Pb) free solders, the TLPS adhesives do not spread as they form the intermetallic joint. Rework of the TLPS system is very difficult due to the high secondary reflow temperatures. Transient Liquid Phase Sintering is the terminology given to a process to describe the resulting metallurgical condition when two or more TLPS compatible materials are brought in contact with one another and raised to a temperature sufficient to melt the low temperature metal. To create a TLPS process or interconnect at least one of those metals is from a family of metals having a low melting point, such as tin (Sn) or indium (In), and the second metal is from a family having high melting points, such as copper (Cu) or silver (Ag). When Sn and Cu are brought together, and the temperature elevated, the Sn and Cu form CuSn intermetallics and the resulting melting point is higher than the melting point of the metal having a low melting point. In the case of In and Ag, when sufficient heat is applied to the In to cause it to melt it actually diffuses into the Ag creating a solid solution which in turn has a higher melting point than the In itself. TLPS will be used to generically reference the process and the TLPS compatible materials used to create a metallurgical bond between two or more TLPS compatible metals. TLPS provides an electrical and mechanical interconnect that can be formed at a relatively low temperature (<300° C.) and having a secondary re-melt temperature >600° C. These temperatures are determined by the different combination of TLPS compatible metals. TLPS will be used to generically pertain to the process and materials used to create a TLPS metallurgical bond or interconnect. The rate of diffusion or sintering is a time temperature function and is different for the different combinations of metals. The result is a solid solution having a new melt temperature approaching that of the high temperature melting metal.

The TLPS technology is particularly suited to providing both a mechanical and electrical conductive metallurgical bond between two mating surfaces preferably that are relatively flat. The metals typically used for the TLPS process are selected from two metal families. One consists of low melting temperature metals such as indium, tin, lead, antimony, bismuth, cadmium, zinc, gallium, tellurium, mercury, thallium, selenium, or polonium and a second family consist of high temperature melting metals such as silver, copper, aluminum, gold, platinum, palladium, beryllium, rhodium, nickel, cobalt, iron and molybdenum to create a diffused solid solution.

It is highly desirable to use a flux free process to eliminate any potential voids within the joint. Since TLPS is a sintering based process, the bond line is uniform and void free. Fluxes, which are necessary with solders, get entrapped in the joint and are subsequently burned out leaving a void. In the case with the semi-conductor industry, and specifically with die attach processes, these voids can create hot spots within the integrated circuit (I/C) which can lead to premature failure and reliability issues. TLPS addresses this issue since TLPS is a sintering process and free of fluxes. When the two metals are mated together and heat is applied, the lower melting metal diffuses into the higher melting metal to create a solid solution across the mating surface area. To create a solid uniform bond line it is important that the mating surfaces be flat and coplanar to insure intimate contact across the entire mating surface. The required flatness of the mating surfaces also limits the application of this technology because there are many surfaces that are not sufficiently planar to yield a good joint.

The use of TLPS in paste form allows uneven surfaces to be joined. More specifically, the use of TLPS in paste form allows two irregular shaped surfaces to be joined with no intimate, or continuous, line of contact. A TLPS compatible metal particle core combined with a liquid carrier material to form a paste can be applied between two non-planar non-uniform surfaces having mixed surface preparation technologies such as plating, sintered thick film, and or plated sintered thick film and then heating to the melting temperature of the metal having the lowest melting point and holding that temperature for a sufficient amount of time to form a joint. A single metal particle core eliminates the need for multiple metals in a paste thus making the ratios of metals a non-issue. It is also possible to create a single particle by using silver, a metal having a high melting point of approximately 960° C. as a core particle, and then coating that particle with a metal shell having a low temperature metal such as indium having a melting point of 157° C.

A two-step reflow can also be used with the transient liquid phase sintering process wherein in the first step an electrically conductive metallurgical bond is formed at low temperature using a relatively short time cycle, in the range of 5 seconds to 5 minutes, and low temperature, in the range of 180° C. to 280° C., depending on the metals being used in the TLPS alloying process. In the second step the part is subjected to an isothermal aging process using a temperature range of 200° C. to 300° C. for a longer duration such as, but not limited to, 5 minutes to 60 minutes. The shorter times required to form the initial bond are well suited for an automated process. In another method a single step process can be used wherein the TLPS forms a terminal, or conductive metallurgical bond, between the external leads and electronic element(s) at temperatures of, for example, 250° C. to 325° C. for a duration of, for example, 10 seconds to 30 seconds. Lower temperatures, such as 175° C. to 210° C., can be used for a longer duration, such as 10 to 30 minutes. This is particularly useful when the electronic component itself is sensitive to temperature.

Indium powder mixed with a flux and solvent to form a paste can be applied to produce a TLPS metallurgical bond between two coupons having a base metal of copper overplated with Ni and then overplated with about 5 microns (200 μinches) of silver. The samples can be prepared by dispensing the indium paste onto a coupon having the plated surfaces as mentioned and then placing two coupons in contact with one another and heating to 150° C. for 5 seconds, followed by increasing the temperature to about 320° C. for about 60 seconds. The joint strength of the sample thus prepared can exhibit a pull weight in the range of 85-94 pounds equating to shear stress of 4,177 psi and a pull peel weight in the range of 5-9 pounds with an average of 7 pounds can be achieved. These results are comparable to results for SnPb solders having shear strengths of approximately 3000 psi and pull peel strengths in the 7-10 pounds range. One major difference is that the AgIn joint can withstand secondary melt temperatures exceeding 600° C. These results indicate that the In paste used to bond two silver plated coupons is at least equivalent if not stronger than current solder SnPb solders but also has a much higher secondary melt temperature thus yielding a material suitable for high temperature interconnect applications and also being lead free. The TLPS paste or preform may have inert fillers therein to serve two purposes. One purpose is to minimize the cost due to expensive metals and the second purpose is to make direct electrical and metallurgical bonds directly to the non-terminated ends of the electronic element and exposed internal electrodes. The cost can be reduced, particularly, when a gap is to be filled by replacing a portion of, particularly, the high melting metal component with an inert material or with a lower cost conductive material. Particularly preferred fillers for use in place of the high melting point metal are non-metals such as ceramics with melting points >300° C. and glasses or high temperature polymers with glass transition temperatures ($T_g$) >200° C. An example would be thermosetting polymers such as polyimide. Two particular advantages of replacing the high melting point metal with one of these non-metals is that the active low melting point metal of the TLPS with not be consumed by diffusion during the TLPS bond formation. The second advantage of inert fillers when selected from a family of glasses having low melting points is that the glass within the mixture of the TLPS paste or preform will create a bond with the exposed glass frit of the non-terminated and exposed ceramic body of, for example, an MLCC. The non-metals can also be coated with the low melting point metal by methods such a spraying or plating.

Sintered metal interconnects of silver as well as nano-silver and nano-copper can also be used to form interconnects. The resulting interconnect can be formed at using a low temperature sintering process but the bond formed has the high melting point of the associated with the metal, in the case of silver 960° C. However, these processes often require elevated pressures for prolonged times in batch operation that can limit throughput compared CuSn TLPS. Also, nano-sized metals can be prohibitively expensive.

Diffusion soldering can also be used as a joining method to form the interconnect. This combines features of conventional soldering and diffusion bonding processes. The process relies on reaction between a thin layer of molten solder and metal on the components to form one or more intermetallic phases that are solid at the joining temperature. Since a low melting point material, solder reacts with a higher melting point metal this may also be considered in the broader definition of TLPS.

Direct copper bonding can also be used but this is a high temperature diffusion process primarily used in die attach so could be detrimental to some components.

Methods to adhere an external termination to a solder pad can comprise coating two mating surfaces one with a high melting point metal and its mating surface with a low melting point metal. The coating process may consist of vapor deposition or plating. A second method is to sandwich a preform film made from a low melting point metal or an alloy of two or more low melting point metals between two planar surfaces coated with a high melting point metal. A third method is to create a paste consisting of particles of a high melting point metal such as copper and then adding particles of two alloyed low melting point metals and mixed into a dual purpose liquid that cleans the surfaces to be bonded and also serves as the liquid ingredient to the metal particles to form a paste mixture.

If full diffusion of the two metals is not complete in the stated cycle time and the maximum secondary reflow temperature is not reached, the joint can be subjected to a second heating process. In this case the joint, or assembly, can be subjected to a temperature higher than that of the low melting point material and held for a period of time of from 15 minutes up to 2 hours. The time and temperature can be varied to provide a desirable secondary reflow temperature as dictated by secondary assembly processes or final environmental application requirements. In the case of the indium/silver TLPS, secondary melt temperatures in excess of 600° C. can be achieved.

In addition to applying a paste to form a TLPS alloy joint between suitable surfaces this can also be achieved with a preform. In its simplest manifestation the preform can be a thin foil of the low temperature TLPS component. Alternatively, the preform can be produced by casting and drying the paste to remove the solvent. The resulting solid preform can be placed between the surfaces to be bonded. In this case it may be necessary to add a suitable binder to the paste for additional strength after drying. In all these cases the preform should be malleable such that it can conform to the surfaces to be bonded.

An interconnect comprising a single metal, such as indium, contained within a paste can be used to form a bond to a surface coated with a high melting point metal, such as silver. The diffusion of the indium into silver allows a lower temperature transient liquid phase to form that subsequently reacts to achieve a higher temperature bond. Achieving a high rate of diffusion in the lower melting point paste is critical to this bond formation. In order to achieve the desired properties in the final joint, such as reduced voids and a homogeneous phase the addition of other metals to the paste may be desirable. However, it is critical to retain the high diffusivity of the low melting point material. For this reason if one or more metals are required in addition to the low melting point metal it is preferred that these be incorporated by coating the metal powders prior to forming the paste. Coating the lowest melting point metal onto the higher melting point metal is preferred to retain an active surface. Coatings also have the desired effect of reducing the diffusion lengths between the different metallic elements of the paste allowing preferred phases to be more readily formed as opposed to a simple mixing of one or more additional metal powders to the single metal paste.

Conductive adhesives are typically cross linking polymers filled with silver or gold particles that cure or cross link within a specified temperature range, generally 150° C., to form a mechanical bond to the materials to be joined. Their conductivity is created by the metal particles making intimate contact with one another, within the confines of the polymer matrix, to form an electrically conductive path from one particle to another. Because the binder is organic in nature, they have relatively low temperature capabilities, normally in the range of about 150° C. to about 300° C. Conductive epoxies, once cured, cannot be reworked. Unlike TLPS bonds, exposure to high heat or corrosive environments may decompose the polymeric bonds and oxidize the metal particles degrading the electrical properties. Both the electrical and mechanical performance of the interconnect can be compromised resulting in increased ESR and decreased mechanical strength.

Polymer solders may comprise conventional solder systems based on Pb/Sn alloy systems or lead free systems, such as Sn/Sb, which are combined with crosslinking polymers which serve as cleaning agents. The cross-linked polymers also have the ability to form a cross-linked polymer bond, such as an epoxy bond, that forms during the melting phase of the metals thereby forming a solder alloy and a mechanical polymeric bond. An advantage of polymer solders is that the polymeric bond provides additional mechanical bond strength at temperatures above the melting point of the solder, thus giving the solder joint a higher operating temperature in the range of about 5 to 80° C. above the melting point of the solder. Polymer solders combine current solder alloys with a cross linking polymer within the same paste to provide both a metallurgical bond and a mechanical bond when cured, such as by heating, to provide additional solder joint strength at elevated temperatures. However, the upper temperature limits and joint strength has been increased, just by the physical properties of the materials. A practical limit of 300° C. remains whereas the bonds created by TLPS can achieve higher temperatures.

In many applications a high degree of porosity may be acceptable. However, in harsh environments, such a high humidity or in circuit board mounting processes, high porosity is not desirable since water or other chemicals may penetrate through the bond which may cause the bond to fail. A preferred embodiment of this invention is therefore to form a low porosity termination within the transient liquid phase sintering joint using a thermo-compression bonding process. This process has the added advantage of using a low process time of 15 to 30 seconds at a temperature in the range of 225° C. to 300° C. in a single step making it suitable for automation. Robust joints can be created for the application of attaching external leads to electronic elements, when leads are used, with a one-step low temperature in less than 30 seconds and in combination with thermo-compression bonding.

Thermo compression bonding is also a preferred processing method when using polymer solder because it assists in the formation of a high-density metallurgical bond between the contacting surfaces. The advantages of thermo-compression include a more robust bond with respect to secondary attachment processes and attachments with higher strength are achieved. A compressive force of 0.5 to 4.5 Kilograms/cm2 (7.1 to 64 psi) and more preferably 0.6 to 0.8 Kilograms/cm 2 (8.5 to 11 psi) is sufficient for demonstration of the thermo-compression teachings herein. About 0.63 Kilograms/cm2 (9 psi) is a particularly suitable pressure for demonstration of the teachings.

It is highly desirable to create a joint with minimum porosity that exhibits the following characteristics: strong mechanical strength in excess of 5 Lbs./inch for Pull Peel test, Tensile, and Shear high electrical conductivity, low initial process temperature in the range of 150° C. to 225° C., a secondary reflow temperature in excess of 300° C. or higher, between non-uniform surfaces making intimate contact or having gaps up to 0.015 inches.

The material of construction for the circuit board is not particularly limited herein with standard printed circuit board (PCB) materials being suitable for use. Laminates, fiber reinforced resins, ceramic filled resins, specialty materials and flexible substrates are particularly suitable. Flame Retardant (FR) laminates are particularly suitable as an circuit board material and especially FR-1, FR-2, FR-3, FR-4, FR-5 or FR-6. FR-2 is a phenolic paper, phenolic cotton paper or paper impregnated with phenol formaldehyde resin. FR-4 is particularly preferred which is a woven fiberglass cloth impregnated with epoxy resin. Composite epoxy materials (CEM) are suitable and particularly CEM-1, CEM-2, CEM-3, CEM-4 or CEM-5 each of which comprise reinforcement such as a cotton paper, non-woven glass or woven glass in epoxy. Glass substrates (G) are widely used such as G-5, G-7, G-9, G-10, G-11 and others with G-10 and G-11 being most preferred each of which is a woven glass in epoxy. Polytetrafluoroethylene (PTFE), which can be ceramic filled, or fiberglass reinforced such as in RF-35, is a particularly suitable substrate. Electronic grade ceramic materials such as polyether ether ketone (PEEK), alumina or yttria stabilized zirconia are available with 96% $Al_2O_3$ and 99.6% $Al_2O_3$ being readily available commercially. Bismaleimide-Triazine (BT) epoxy is a particularly suitable substrate material. Flexible substrates are typically a polyimide such as a polyimide foil available commercially as Kapton or UPILEX or a polyimide-fluoropolymer composite commercially available as Pyrelux. Ferous alloys are also used such as Alloy 42, Invar, Kovar or non-ferrous materials such as Cu, Phosphor Bronze or BeCu.

The MLCC can be over-molded by a non-conductive polymer or resin. The material used for overmolding is not particularly limited herein. Overmolding can be done to isolate MLCC from electrical interaction with other elements of a circuit or to protect the package, or components therein, from environmental variations. Overmolding can also be beneficial for labeling and for use with pick-and-place equipment since the over-molding can be applied with specific geometry identifiable by optical or mechanical equipment.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. An MLCC capacitor comprising:
a multiplicity of conductive internal electrodes of alternating polarity with dielectric ceramic there between; and
a multiplicity of ID markers wherein each ID marker of said ID markers is coplanar with at least one internal electrode of said internal electrodes wherein said ID markers are not electrically terminated and extend to an outer boundary of said MLCC.

2. The MLCC of claim 1 wherein said internal electrodes and said ID markers comprise the same material.

3. The MLCC of claim 1 wherein said internal electrodes comprise a material selected from a base metal and a precious metal.

4. The MLCC of claim 3 wherein said internal electrodes comprise a material selected from the group consisting of nickel, manganese, chromium, cobalt, aluminum, copper, palladium and silver.

5. The MLCC of claim 4 wherein said internal electrodes comprise an alloy of nickel.

6. The MLCC of claim 1 wherein multiple of said ID marks are co-linear ID marks.

7. The MLCC of claim 6 wherein said co-linear ID marks extent a height of said MLCC.

8. The MLCC of claim 6 wherein said co-linear ID marks do not extent a height of said MLCC.

9. The MLCC of claim 1 wherein said ID markers are non-active.

10. The MLCC of claim 1 wherein each said internal electrode of said internal electrodes is in an active layer.

11. The MLCC of claim 10 wherein each said active layer comprises at least one said ID mark.

12. The MLCC of claim 10 comprising 2-2000 active layers.

13. The MLCC of claim 12 comprising 2-450 active layers.

14. The MLCC of claim 1 wherein said ID markers have a thickness of 0.5 to 25 µm.

15. The MLCC of claim 14 wherein said ID markers have a thickness of 1 to 2.5 µm.

16. The MLCC of claim 1 further comprising at least one external terminal.

* * * * *